Oct. 24, 1961 P. H. SHERRON 3,005,277

TELEPHONE BOOTH MOUNTING FOR ADVERTISEMENT

Filed Feb. 12, 1958 2 Sheets-Sheet 1

INVENTOR.
PERCIVAL H. SHERRON

BY Darby & Darby

ATTORNEYS

TELEPHONE BOOTH MOUNTING FOR ADVERTISEMENT

Filed Feb. 12, 1958 2 Sheets-Sheet 2

INVENTOR
PERCIVAL H. SHERRON
BY
Darby & Darby
ATTORNEYS 3,005,277

TELEPHONE BOOTH MOUNTING FOR ADVERTISEMENT

Percival H. Sherron, 84—15 Kendrick Road, Jamaica, N.Y.

Filed Feb. 12, 1958, Ser. No. 714,828
4 Claims. (Cl. 40—125)

This invention relates to telephone booths and, more particularly, to a telephone booth structure providing for the mounting of advertisement-bearing panels in the walls of the booth. The present application is a continuation-in-part of my copending application of the same title, Serial No. 527,854 filed August 11, 1955, now abandoned.

It is the primary object of this invention to provide improved means for mounting an advertisement or other indicia bearing card or panel in a telephone booth structure in such a manner as to make it visible from both the interior and exterior of the booth, and to protect the card from the weather.

It is another object of the invention to provide improved means for mounting an advertisement or the like in a telephone booth structure which may be made inaccessible to unauthorized persons.

It is a further object of the invention to provide such improved means which may be made substantially weather-proof.

These and other objects of the invention will become apparent from the following description when read in conjunction with the accompanying drawings in which, FIGURE 1 is a perspective view of a telephone booth embodying the invention;

Figure 9:
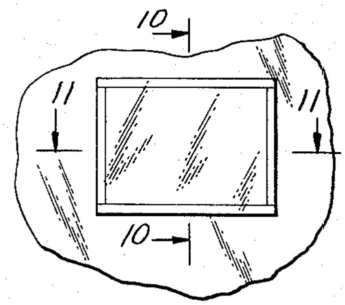
FIGURE 9 is a fragmentary elevational view of another form of advertising panel structure.
Figure 10:
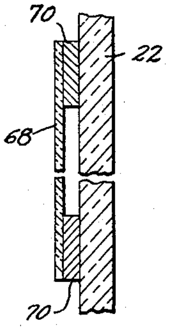
Figure 11:
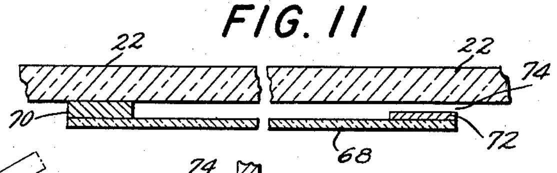
Figure 12:
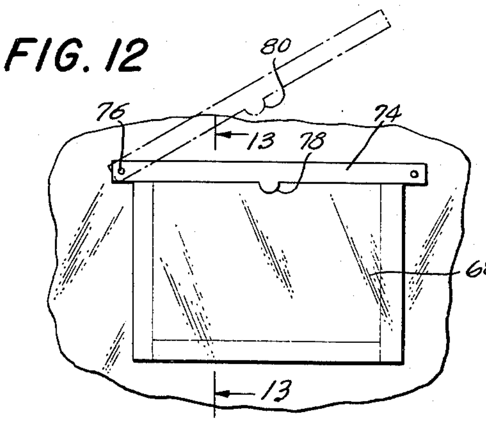
Figure 13:
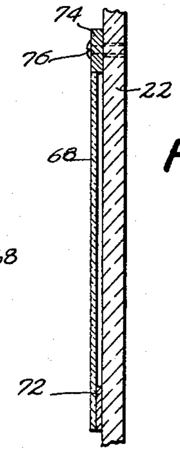

FIGURES 10 and 11 are respectively vertical and horizontal cross-sectional views of the structure of FIGURE 9 taken along lines 10—10 and 11—11 thereof;

FIGURE 12 is a fragmentary elevational view of still another form of advertising panel structure; and FIGURE 13 is a vertical sectional view of FIGURE 12 taken along line 13—13 thereof.

Figure 1:
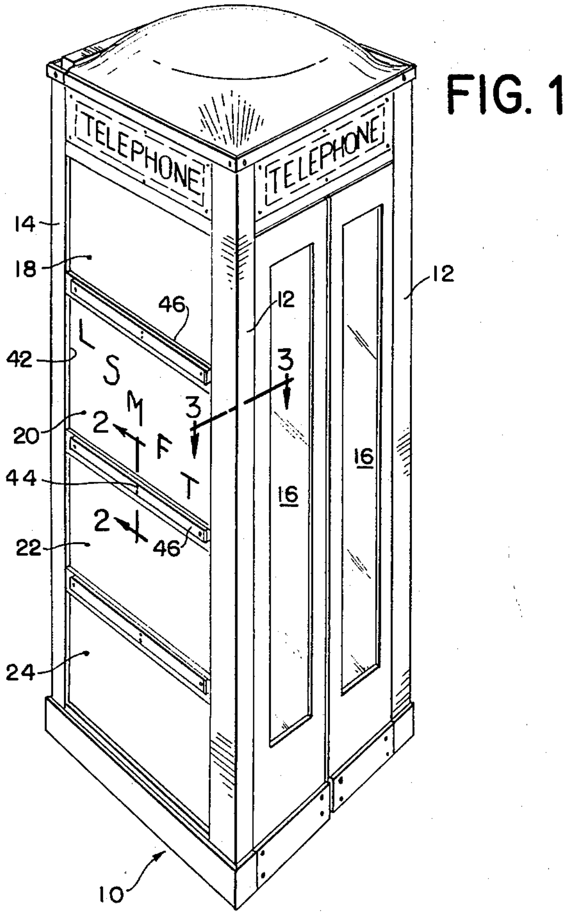

In FIGURE 1 there is shown generally at 10 a perspective view of a telephone booth including front corner posts 12, rear corner posts 14, front doors 16 mounted between the front corner posts 12 and side panels 18, 20, 22 and 24 mounted between the front and rear corner posts.

The side panels 18, 22 and 24 and the remainder of the booth structure are entirely conventional and are of the type more fully disclosed in my copending patent application Serial No. 395,447, filed December 1, 1953, now Patent No. 2,881,306, issued April 7, 1959.

Figure 2:
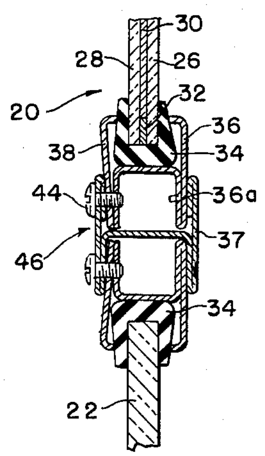
FIGURE 2 is a fragmentary vertical section through the booth taken on the trace 2—2 in FIGURE 1.

The side panels 18, 22 and 24 are formed of a single glass plate, as is clearly shown in FIGURE 2 with respect to panel 22. The side panel 20 includes an inner panel 26 and an outer panel 28 in spaced relation for the reception of an indicia-bearing panel 30. The spacing between the panels 26 and 28 is provided by suitable spacers 32 located at the edges of panels 26 and 28, and around three sides of them. Spacers 32 are preferably cemented or otherwise suitably joined to the panels 26 and 28.

Figure 3:
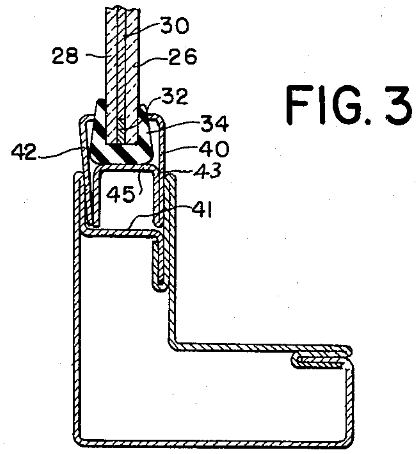
FIGURE 3 is a fragmentary horizontal section through the booth taken on the trace 3—3 in FIGURE 1.

The side panels are mounted within rubber gasket frames 34 which are held in position between horizontally extending angle strips 36 and 38 and vertically extending angle strips 40 and 42, forming retainer plates. The horizontal angle strips 36 are formed integrally with a reversed channel 36*a* sitting within one half of a sheet metal H beam forming a panel separator 37. The horizontally extending strips 38 have a long leg resting between the outer face of separator 37 and channel 36*a*, and a short leg bearing edgewise against the frame 34. These strips 38 are secured by means of screws 44 passing into transversely extending panel separator 37 and channel 36*a*, forming mounting assemblies 46, the ends of which are supported within the adjacent front and rear corner posts. The corner post, as shown in FIGURE 3, has a channel 41 within which is seated the member 43 having angle strip 40 as part thereof, and also having a reversed channel strip 45 seated in channel 41. The vertically extending retainer plates 42 are seated between inner channel strip 45 and the outer wall of channel 41, and held in position at their upper and lower ends by the horizontally extending angle strips 38. Thus, upon removal of the screws 44 from the horizontally extending separators 37, the retainer plates 38 may be removed and thereafter the retainer plates 42 may be removed, whereupon the assembly consisting of the rubber framing 34 and the two panels 26 and 28 may be removed from the assembled telephone booth as a single side panel having the appearance of the panel indicated generally at 48 in FIGURE 4.

It will be evident that one or both of the panels 26 and 28 may be transparent and the indicia panel 30 may carry advertisements, instructions or other indicia on one or both sides thereof and would be visible from the interior and the exterior of the booth if desired.

Figure 5:
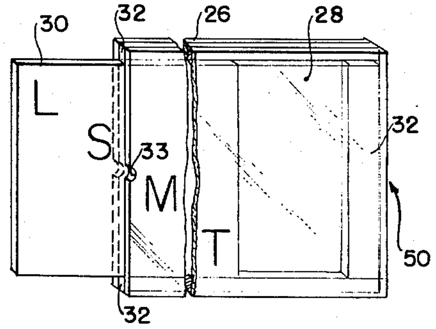
FIGURE 5 is a perspective showing of the panel shown in FIGURE 3 in further state of disassembly.

When the rubber gasket is removed from the panel, as shown generally at 50 in FIGURE 5, the indicia bearing panel 30 may be removed therefrom and replaced. A notch 33 in the panels 26 and 28 may facilitate such removal and replacement. The two panels 26 and 28 and the spacers 32 are preferably cemented or otherwise secured together in order to facilitate the handling of the panel during insertion or removal of the indicia bearing card.

From the foregoing, it will be evident that the structure described provides for the mounting of an indicia bearing panel between a pair of spaced telephone booth side panels one or both of which may be transparent and the arrangement further provides for this mounting in weather-tight relation and in a manner making it substantially impossible for unauthorized persons to tamper with or mutilate the indicia bearing panels.

It will be noted that the arrangement of screws 44 shown in FIGURES 1 and 2 provided for securing the retaining strip 38 may be arranged so as to be on the interior of the booth in order that the indicia mounting panel assembly may be removed from the wall of the telephone booth from the interior thereof as may be desirable in installations in which a plurality of booths are mounted adjacent to each other, thus substantially eliminating the existence of space between the booths externally of the booths.

Figure 4:
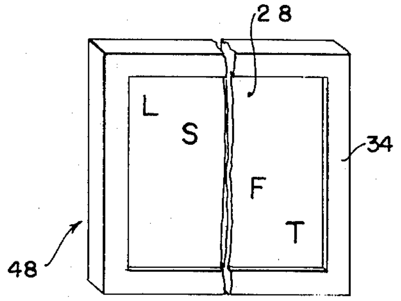
FIGURE 4 is a perspective showing of a portion of one of the side panels of the booth disassembled from the booth.
Figure 6:
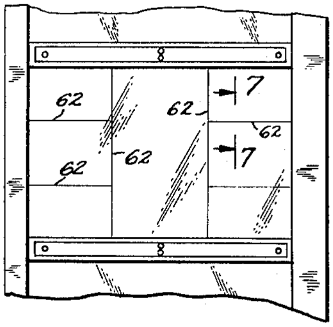
FIGURE 6 is an elevation view of a modified form of advertising panel structure.
Figure 7:
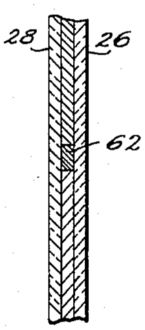
FIGURE 7 is a fragmentary vertical cross-sectional view taken along line 7—7 of FIG. 6.
Figure 8:
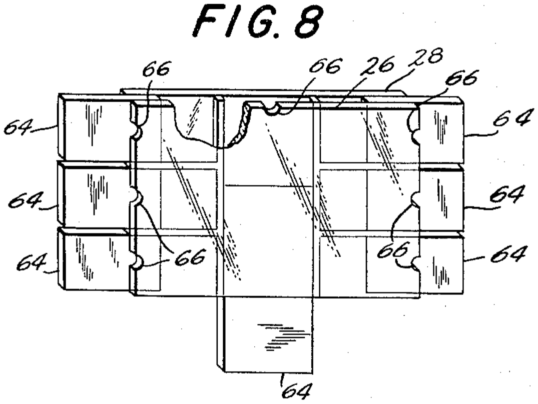
FIGURE 8 is a fragmentary perspective view of the structure of FIGURE 6.

While in FIGURES 4 and 5 a single indicia panel 30 is indicated as filling the entire space between the two panels 26 and 28, this is not essential. As shown in FIGURES 6, 7 and 8, spacers 62 may be positioned between panels 26 and 28 in varying configurations to provide corresponding areas in which separate indicia panels 64 may be inserted as shown more clearly in FIGURE 8. It will be obvious that the panels 26 and 28 may be subdivided in any desired manner, not necessarily confined to the example illustrated in FIGURES 6 to 8. As before, notches 66 may be formed in the edges of panels 26 and 28 to facilitate removal and replacement of the indicia panels 64. These notches 66 may be concealed behind the edges of the rubber frame or gasket 34 so as not to be visible in the assembled condition of the structure.

Where it is not essential that the structure be made tamper-proof, a modified form such as shown in FIGURES 9 to 11 may be employed. In this form a transparent panel 68 is suitably secured to any of the side panels, such as 22, by spacers 70 extending around and suitably secured to three edges thereof. In this instance the three edges would be the top, bottom and left edge. As shown in FIGURE 11 the remaining edge, illustratively the right edge, is provided with a thinner spacer 72 leaving a gap 74 between spacer 72 and the side panel 22. This gap permits the interposition of an indicia panel (not shown) between the panels 68 and 22, and the spacer 72 serves to retain such an indicia panel against accidental dislodgment.

FIGURES 12 and 13 illustrate still another simple structure in which the transparent panel 68 is secured to the panel 22 by spacers 72 on all sides except the top. At the top edge a closure bar 74 is provided, pivotally secured to the panel 22 as by a screw 76, so that the bar 74 may be raised as indicated in dash-dot lines in FIGURE 12. The panel 68 may have a notch 78 formed therein cooperating with a protuberance 80 in the bar 74 to provide a covered thumbhole for ready insertion of an indicia panel between the transparent panel 68 and the main side panel 22.

It will be understood that in either of the forms of FIGURES 9 to 11 or FIGURES 12 to 13 the structure retaining the indicia panel may be positioned on the inside or on the outside of the telephone booth. The panel 22 may be made transparent where desired so that a double-faced indicia panel may be employed, or the panel 68 may be made opaque so that the indicia panel is readable only through the main side panel 22.

The foregoing embodiments of the present invention have thus provided simple structures for incorporating replaceable indicia-bearing panels in a telephone booth structure, with full visibility and ease of replacement. It will be apparent that many other variations of the invention may be readily devised without departing from the spirit of the present invention. The foregoing description is therefore to be considered as illustrative only, the scope of the invention being defined solely by the appended claims.

What is claimed is:

1. In a telephone booth including corner posts, a wall panel assembly including an inside panel, an outside panel, and means spacing said panels apart and providing for the reception of an indicia-bearing panel therebetween, at least one of said panels being transparent, and means removably mounting said assembly in a wall of said telephone booth, said mounting means comprising a compressible frame surrounding the edge of said assembly, a channel formed in each of two adjacent ones of said corner posts and adapted to receive reversed channel members, the bases of which loosely engage respective opposite peripheral edges of said frame, a pair of spaced members extending between said corner posts and also having respective channels adapted to receive reversed channel members, the bases of which loosely engage respective other peripheral edges of said frame, a retainer angle strip extending along each edge of said frame and adapted to have one leg between said frame and a wall of a respective channel and a wall of the corresponding reversed channel and another leg bearing on said frame, and means for retaining said strips under pressure against said frame, whereby said panel assembly is retained in position in a weather-protected manner.

2. In a telephone booth including corner posts, a wall panel assembly including an inside panel, an outside panel, and means spacing said panels apart and providing for the reception of an indicia-bearing panel therebetween, at least one of said panels being transparent, and means removably mounting said assembly in a wall of said telephone booth, said mounting means comprising a compressible frame surrounding the edge of said assembly, a channel formed in each of two adjacent ones of said corner posts wider than the thickness of said frame, a pair of spaced members extending between said corner posts and also having respective channels wider than the thickness of said frame, a first retainer member in each of said channels having a first portion spaced from the bottom of said channel and adapted to engage the edge of said frame, and also having a second portion extending perpendicularly to said edge engaging portion and parallel to said panel, said second portion being adapted to engage one side of said frame, said first retainer member having a third portion extending from said edge engaging portion towards the bottom of said channel, a second retainer member in said channel having a portion extending along and engaging the other side of said frame and having another portion between said third portion of said first retaining member and a wall of a respective channel, and means for retaining said members under pressure against said frame.

3. A structure as in claim 2, wherein the portion of each of said retainer members engaging a frame side is perpendicularly to and adapted to bear against a respective adjacent frame side, and serving to retain said panel assembly in position in weather-tight manner.

4. In a telephone booth including corner posts, a wall panel assembly including an inside panel, an outside panel, and means spacing said panels apart and providing for the reception of an indicia-bearing panel therebetween, at least one of said panels being transparent, and means removably mounting said assembly in a wall of said telephone booth, said mounting means comprising a compressible frame surrounding the edge of said assembly, a channel formed in each of two adjacent ones of said corner posts, said channels being wider than the thickness of said frame, a pair of spaced members extending between said corner posts and also having respective channels wider than the thickness of said frame, a retainer member in each of said channels, comprising a reversed channel the base of which engages a peripheral edge of said frame, said reversed channel including an outwardly extending strip adapted to engage one side of said frame, a second strip extending between a leg of each of said channels and a corresponding leg of each of said reversed channels, said second strips extending outwardly and bearing against respective other sides of said frame, said second strips associated with said spaced members extending between said second strips of said corner posts and respective legs of said channels of said corner posts to thereby lock said corner post strips in position, and means for retaining said second strips of said spaced members in position against said frame.

References Cited in the file of this patent

UNITED STATES PATENTS

| | | |
|---|---|---|
| 490,654 | Holfert | Jan. 31, 1893 |
| 1,465,244 | Hager | Aug. 14, 1923 |
| 1,888,564 | O'Rourke | Nov. 22, 1932 |
| 2,039,998 | Hollister | May 5, 1936 |
| 2,104,280 | Sprately et al. | Jan. 4, 1938 |
| 2,141,039 | Hamm | Dec. 20, 1938 |
| 2,280,542 | Rosendale | Apr. 21, 1942 |
| 2,337,885 | Hallam | Dec. 28, 1943 |
| 2,554,359 | Clark | May 22, 1951 |
| 2,589,517 | Stelzer | Mar. 18, 1952 |
| 2,654,172 | Solomon | Oct. 6, 1953 |
| 2,775,050 | Ellsworth | Dec. 25, 1956 |

FOREIGN PATENTS

| | | |
|---|---|---|
| 531,863 | Great Britain | Jan. 13, 1941 |